R. P. ROWE.
LAST.
APPLICATION FILED APR. 3, 1912.
1,184,775.
Patented May 30, 1916.
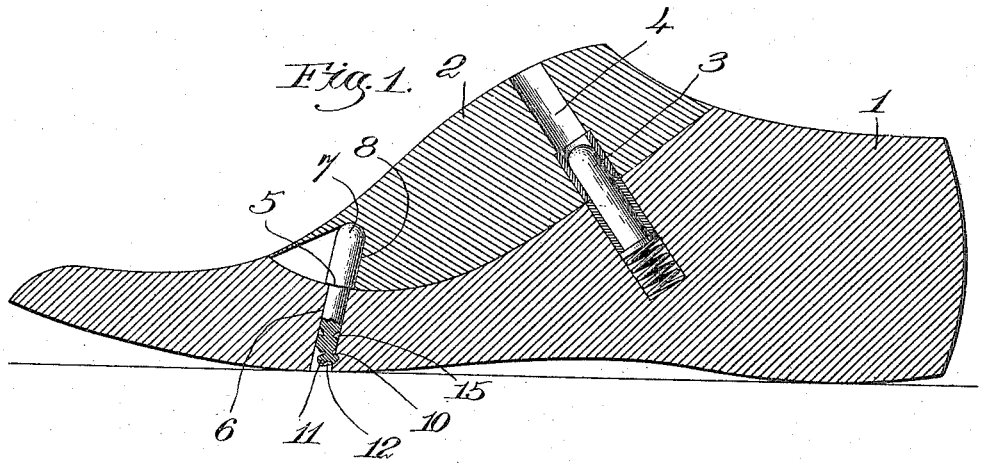
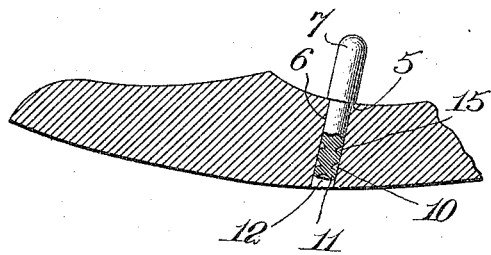
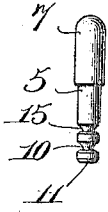
Witnesses.
Thomas J. Drummond.
Warren O'Neil.
Inventor.
Ralph P. Rowe,
by Edmunds Heard & Smith
Attys.

UNITED STATES PATENT OFFICE.

RALPH P. ROWE, OF STOUGHTON, MASSACHUSETTS, ASSIGNOR OF ONE-HALF TO GEORGE E. BELCHER, OF STOUGHTON, MASSACHUSETTS.

LAST.

1,184,775.   Specification of Letters Patent.   Patented May 30, 1916.

Application filed April 3, 1912. Serial No. 688,179.

*To all whom it may concern:*

Be it known that I, RALPH P. ROWE, a citizen of the United States, residing at Stoughton, county of Norfolk, State of Massachusetts, have invented an Improvement in Lasts, of which the following description, in connection with the accompanying drawing, is a specification, like characters on the drawing representing like parts.

This invention relates to lasts of that type which comprise two separable last members that are secured together by means including a dowel pin, and the object of the invention is to provide a novel dowel pin for this purpose having such a construction that it can be firmly anchored in one of the last members.

In order to illustrate the invention I have shown it as it would be employed in a last of that type in which the separable last members are in the form of complemental body portions and instep portions, although the invention is capable of use in any last where a dowel pin is required for holding two separate parts together.

Figure 1 is a vertical section through the last having my improvements applied thereto; Fig. 2 is a similar view showing the dowel pin when it is first inserted in the last and before the end thereof is displaced laterally to anchor it in the last; Fig. 3 is a view of the dowel pin.

The last herein shown comprises the body portion 1 and the complemental instep portion 2, these two parts being held together by a dowel pin situated adjacent the lower end of the instep portion and which will be hereinafter described, and a yieldingly-sustained locking pin 3 situated at the upper end of the instep portion and which enters an aperture 4 in the instep portion. The dowel pin and locking pin having an angular relation to each other so that when both engage the instep portion the latter is held firmly in place. Said instep portion can be removed, however, by forcing inwardly the locking pin until it is disengaged from the aperture 4, as will be well understood by those skilled in the art.

My improved dowel pin is of that type which is anchored to the last by having its lower extremity displaced laterally thereby to be embedded in the material of the last. My improved dowel pin is shown at 5 and it is driven into an aperture 6 formed in the body portion 1 of the last, said dowel pin having a last member positioning portion 7 that extends beyond the body portion and enters the socket 8 in the instep portion, the inner end of the dowel constituting an anchoring portion. The dowel pin is made in the first instance with a straight shank or anchoring portion adapted to enter the aperture 6 and it is locked in the body portion by displacing bodily in one direction the entire lower extremity thereof. To permit this to be done, I propose to form the dowel pin with a groove 10 near its end which weakens the dowel pin at this point to such an extent that it can be bent at the groove thereby permitting the portion 11 beyond the groove to be displaced laterally and embedded in the wood of the last. In order to secure my dowel pin in place it is first driven into the aperture 6 and then a suitable tool is inserted in the lower end of the aperture 6, which, by the way, will be formed clear through the body portion, until it engages the end 11 of the dowel pin, and then said tool is acted upon by blows or by pressure which are delivered or applied in such a direction that the portion 11 of the dowel pin will be bent laterally and forced into the wood of the last. I prefer to form the end of the dowel pin with a slight recess 12 so as to guide the tool in its operation on the pin, but this is not essential.

Fig. 1 shows clearly how the end 11 of the dowel pin is displaced laterally and when displaced it becomes embedded into the wood and thus firmly locks the dowel pin in place. The groove 10 is of assistance in this operation because it weakens the dowel pin at this point sufficiently so that the portion 11 can be readily bent laterally. If desired I may make the shank of the dowel pin with one or more other grooves 15 to assist in anchoring the pin in place, for when said pin is driven into the aperture 6 the fibers of the wood will tend to swell outwardly and fill the groove 15, thus giving an added interlocking connection.

While I have shown my invention herein as it might be applied to a last having complemental body and instep portions, yet I wish it distinctly understood that my improved dowel pin may be used in other types of lasts wherever a dowel pin is necessary for assisting in holding two parts of the last together.

Having fully described my invention, what I claim as new and desire to secure by Letters Patent is:—

A dowel pin for assisting in holding together two separable members, said dowel pin comprising a positioning portion adapted to engage one of the members and a shank portion adapted to be anchored in the other member, said shank portion having a circumferential line of weakness near its end whereby after it is inserted into said member the extremity thereof can be displaced laterally entirely in one direction thereby to become embedded in the material of said member.

In testimony whereof, I have signed my name to this specification, in the presence of two subscribing witnesses.

RALPH P. ROWE.

Witnesses:
S. A. UPHAM,
PAUL S. JONES.

Copies of this patent may be obtained for five cents each, by addressing the "Commissioner of Patents, Washington, D. C."